United States Patent
Yamamoto

(10) Patent No.: US 12,069,366 B2
(45) Date of Patent: Aug. 20, 2024

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Hideaki Yamamoto, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 109 days.

(21) Appl. No.: 17/785,725

(22) PCT Filed: Dec. 11, 2020

(86) PCT No.: PCT/JP2020/046265
§ 371 (c)(1),
(2) Date: Jun. 15, 2022

(87) PCT Pub. No.: WO2021/131788
PCT Pub. Date: Jul. 1, 2021

(65) Prior Publication Data
US 2023/0049796 A1    Feb. 16, 2023

(30) Foreign Application Priority Data
Dec. 25, 2019  (JP) .................. 2019-234483

(51) Int. Cl.
*H04N 23/60* (2023.01)
*G04R 20/02* (2013.01)
(Continued)

(52) U.S. Cl.
CPC .......... *H04N 23/665* (2023.01); *G04R 20/02* (2013.01); *G06V 10/803* (2022.01); *G06V 20/58* (2022.01)

(58) Field of Classification Search
CPC ........ H04N 23/665; H04N 23/60; H04N 7/18; G04R 20/02; G06V 10/803; G06V 20/58; G01C 21/26; G01D 9/00; G07C 5/00
See application file for complete search history.

(56) References Cited

U.S. PATENT DOCUMENTS

| | | | |
|---|---|---|---|
| 7,236,596 B2* | 6/2007 | Prokoski ............... | H04L 9/3297 380/258 |
| 2012/0023103 A1* | 1/2012 | Soderberg ............... | G06F 16/51 707/E17.031 |

(Continued)

FOREIGN PATENT DOCUMENTS

| | | |
|---|---|---|
| JP | 2010-236891 A | 10/2010 |
| JP | 2011-159093 A | 8/2011 |

(Continued)

OTHER PUBLICATIONS

International Search Report and Written Opinion of PCT Application No. PCT/JP2020/046265, issued on Mar. 2, 2021, 08 pages of ISRWO.

*Primary Examiner* — Michael Lee
(74) *Attorney, Agent, or Firm* — CHIP LAW GROUP

(57) ABSTRACT

The present technology relates to an information processing apparatus, an information processing method, and a program that allow a sensing time of a sensor to be easily and accurately determined. An information processing apparatus includes a control circuit that outputs a control signal for controlling a sensing timing of a sensor, a counter that updates a counter value in a predetermined cycle, and an addition circuit that adds, to sensor data output from the sensor, sensing time information including a first counter value, a second counter value, and a GNSS (Global Navigation Satellite System) time in a GNSS. The first counter value is obtained when the control signal is output from the control circuit, and the second counter value is obtained (Continued)

when a pulse signal synchronous with the GNSS time is output from a GNSS receiver. The present technology can be applied to, for example, a vehicle-mounted camera.

20 Claims, 8 Drawing Sheets

(51) Int. Cl.
*G06V 10/80* (2022.01)
*G06V 20/58* (2022.01)

(56) References Cited

U.S. PATENT DOCUMENTS

| | | | |
|---|---|---|---|
| 2013/0176170 A1* | 7/2013 | Babitch | G01S 19/235 342/357.65 |
| 2013/0242135 A1* | 9/2013 | Muraki | H04N 23/662 348/231.5 |
| 2018/0103182 A1* | 4/2018 | Ito | H04N 25/74 |
| 2019/0387190 A1 | 12/2019 | Ito | |
| 2020/0064861 A1* | 2/2020 | Zhang | H04Q 9/04 |
| 2021/0190966 A1* | 6/2021 | Somieski | G01S 19/37 |

FOREIGN PATENT DOCUMENTS

| | | |
|---|---|---|
| JP | 2018-061183 A | 4/2018 |
| JP | 2019-220737 A | 12/2019 |

\* cited by examiner

F I G. 1
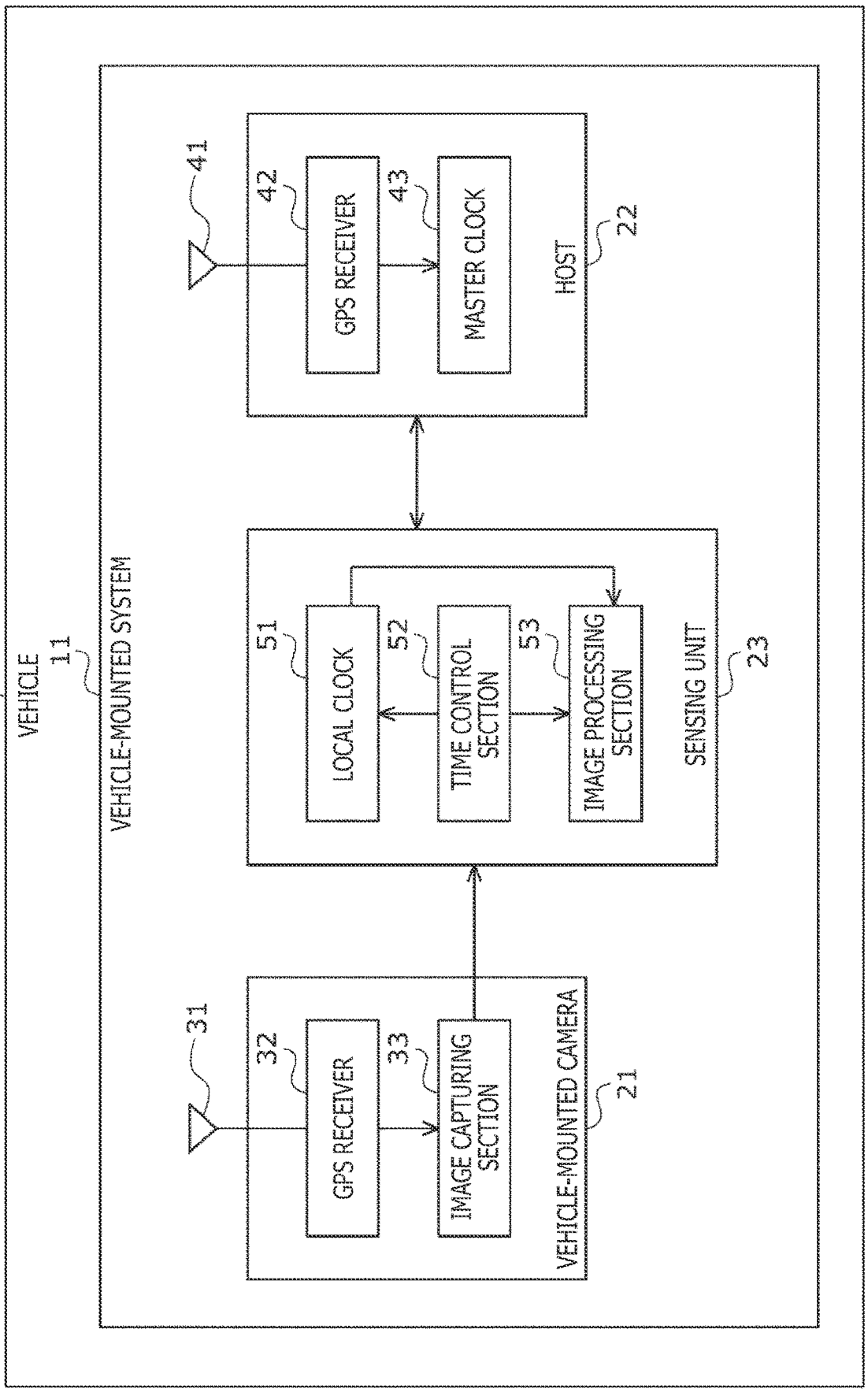

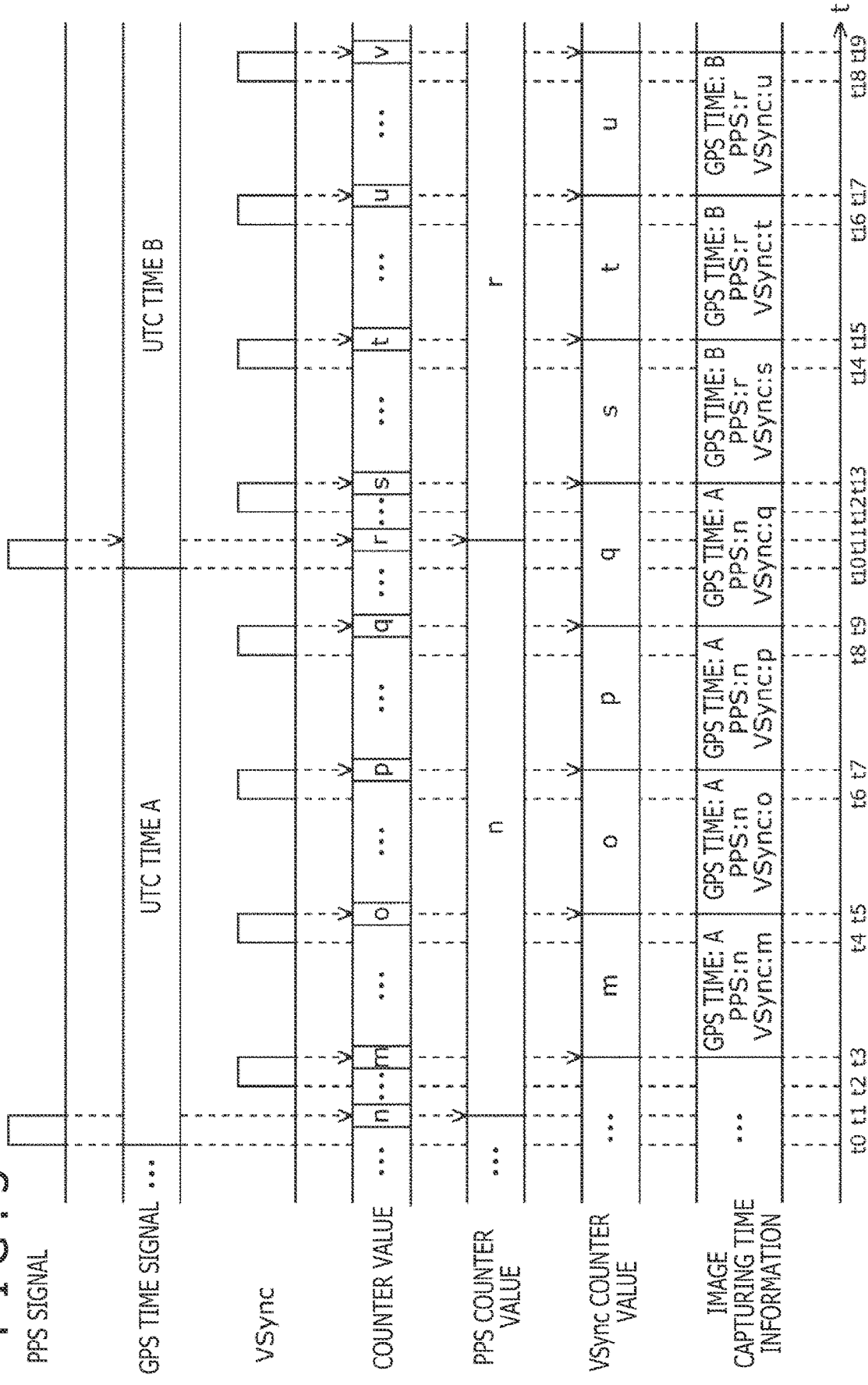
F I G. 3

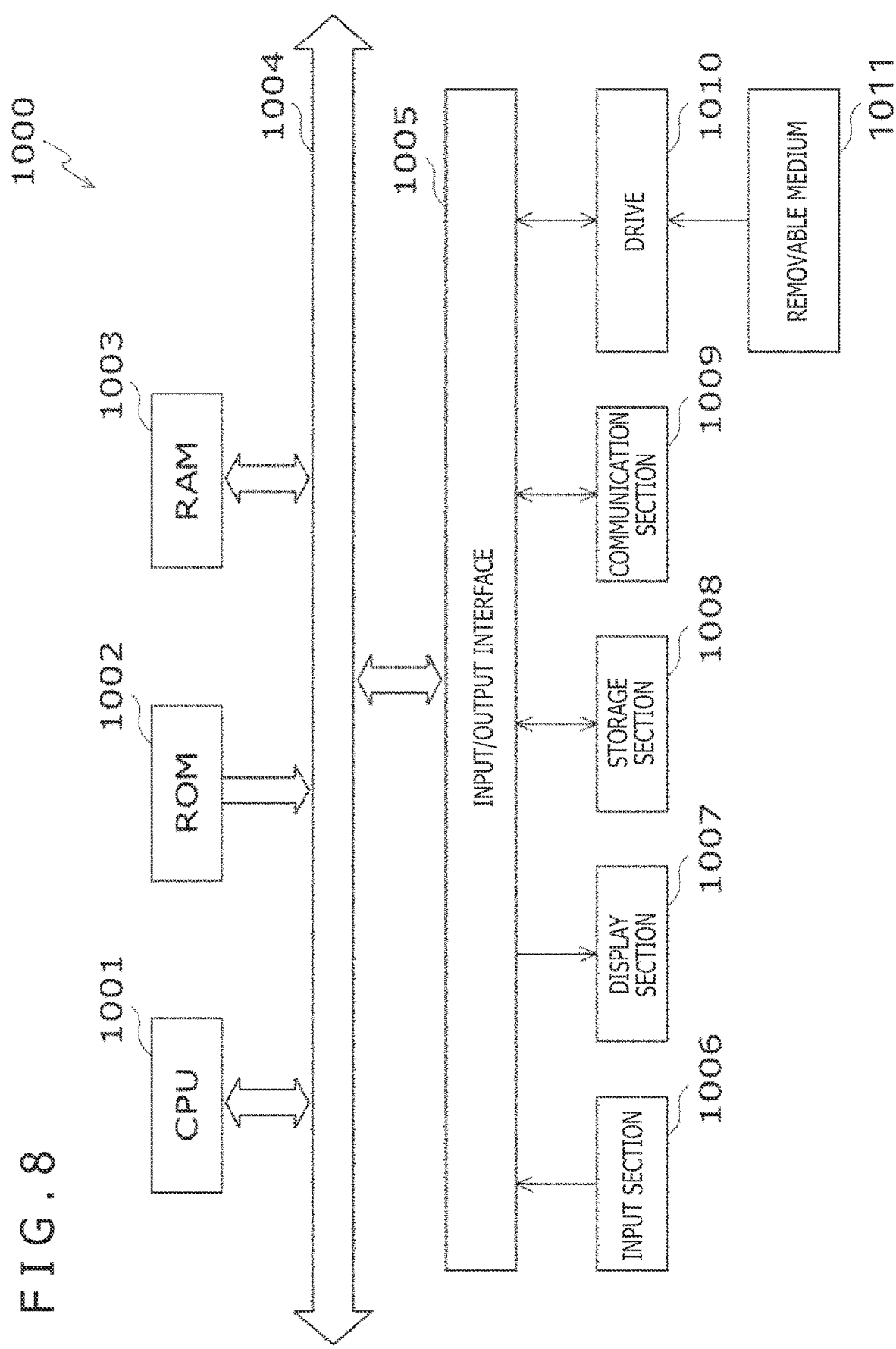

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/046265 filed on Dec. 11, 2020, which claims priority benefit of Japanese Patent Application No. JP 2019-234483 filed in the Japan Patent Office on Dec. 25, 2019. Each of the above-referenced applications is hereby incorporated herein by reference in its entirety.

TECHNICAL FIELD

The present technology relates to an information processing apparatus, an information processing method, and a program, and in particular, to an information processing apparatus, an information processing method, and a program that are suitably used to determine a sensing time of a sensor.

BACKGROUND ART

There has been proposed a technology related to a vehicle-mounted surveillance camera that embeds, in image data, time data based on an internal clock, and in this technology, the time of the internal clock is automatically corrected on the basis of time information received from a GPS (see, for example, PTL 1).

In the related art, there has also been proposed a technology in which a shutter of an image capturing apparatus is controlled to be opened and closed in synchronism with the time externally supplied from a GPS or the like (see, for example, PTL 2).

CITATION LIST

Patent Literature

[PTL 1]
  JP 2011-159093A
[PTL 2]
  JP 2010-236891A

SUMMARY

Technical Problems

In the invention described in PTL 1, however, a real-time clock and means for correcting the time of the real-time clock need to be provided in the vehicle-mounted surveillance camera, increasing a design cost and a manufacturing cost.

Additionally, in the invention described in PTL 2, image capturing timings are limited to those which are synchronous with the externally supplied time. On the other hand, in a case where images are captured at timings that are asynchronous with the externally supplied time, it is difficult to determine the image capturing time correctly.

In view of these circumstances, an object of the present technology is to allow the sensing time of a sensor such as an image sensor to be easily and accurately determined.

Solution to Problems

An information processing apparatus according to a first aspect of the present technology includes a control circuit that outputs a control signal for controlling a sensing timing of a sensor, a counter that updates a counter value in a predetermined cycle, and an addition circuit that adds, to sensor data output from the sensor, sensing time information including a first counter value, a second counter value, and a GNSS (Global Navigation Satellite System) time in a GNSS. The first counter value is obtained when the control signal is output from the control circuit, and the second counter value is obtained when a pulse signal synchronous with the GNSS time is output from a GNSS receiver.

An information processing method according to the first aspect of the present technology includes, by an information processing apparatus, outputting a control signal for controlling a sensing timing of a sensor, updating a counter value in a predetermined cycle, and adding, to sensor data output from the sensor, sensing time information including a first counter value, a second counter value, and a GNSS (Global Navigation Satellite System) time in a GNSS. The first counter value is obtained when the control signal is output from the control circuit, and the second counter value is obtained when a pulse signal synchronous with the GNSS time is output from a GNSS receiver.

A program according to the first aspect of the present technology is for a computer of an information processing apparatus including a control circuit that outputs a control signal for controlling a sensing timing of a sensor and a counter that updates a counter value in a predetermined cycle. The program causes the computer to add, to sensor data output from the sensor, sensing time information including a first counter value, a second counter value, and a GNSS (Global Navigation Satellite System) time in a GNSS. The first counter value is obtained when the control signal is output from the control circuit, and the second counter value is obtained when a pulse signal synchronous with the GNSS time is output from a GNSS receiver.

An information processing apparatus according to a second aspect of the present technology includes a time control section that calculates a sensing time of sensor data output from a sensor, on the basis of sensing time information output from another information processing apparatus including a control circuit that outputs a control signal for controlling a sensing timing of the sensor and a counter that updates a counter value in a predetermined cycle. The sensing time information includes a first counter value, a second counter value, and a GNSS (Global Navigation Satellite System) time in a GNSS. The first counter value is obtained when the control signal is output, and the second counter value is obtained when a pulse signal synchronous with the GNSS time is output from a first GNSS receiver.

An information processing method according to the second aspect of the present technology includes, by an information processing apparatus, calculating a sensing time of sensor data output from a sensor, on the basis of sensing time information output from another information processing apparatus including a control circuit that outputs a control signal for controlling a sensing timing of the sensor and a counter that updates a counter value in a predetermined cycle. The sensing time information includes a first counter value, a second counter value, and a GNSS (Global Navigation Satellite System) time in a GNSS. The first counter value is obtained when the control signal is output, and the second counter value is obtained when a pulse signal synchronous with the GNSS time is output from a GNSS receiver.

A program according to the second aspect of the present technology calculates a sensing time of sensor data output from a sensor, on the basis of sensing time information output from another information processing apparatus including a control circuit that outputs a control signal for controlling a sensing timing of the sensor and a counter that updates a counter value in a predetermined cycle. The sensing time information includes a first counter value, a second counter value, and a GNSS (Global Navigation Satellite System) time in a GNSS. The first counter value is obtained when the control signal is output, and the second counter value is obtained when a pulse signal synchronous with the GNSS time is output from a GNSS receiver.

In the first aspect of the present technology, the sensing timing of the sensor is controlled, the counter value is updated in the predetermined cycle, and the sensing time information including the first counter value obtained when the control signal is output from the control circuit, the second counter value obtained when the pulse signal synchronous with the GNSS (Global Navigation Satellite System) time in the GNSS is output from the GNSS receiver, and the GNSS time is added to the sensor data output from the sensor.

In the second aspect of the present technology, the sensing time of the sensor data output from the sensor is calculated on the basis of the sensing time information output from another information processing apparatus including the control circuit that outputs the control signal for controlling the sensing timing of the sensor and the counter that updates the counter value in the predetermined cycle. The sensing time information includes the first counter value obtained when the control signal is output, the second counter value obtained when the pulse signal synchronous with the GNSS (Global Navigation Satellite System) time in the GNSS is output from the GNSS receiver, and the GNSS time.

BRIEF DESCRIPTION OF DRAWINGS

FIG. 1 is a block diagram depicting a first embodiment of a vehicle-mounted system to which the present technology is applied.

FIG. 3 is a timing chart for explaining processing of the vehicle-mounted camera.

FIG. 8 is a diagram depicting a configuration example of a computer.

DESCRIPTION OF EMBODIMENTS

Figure 2:
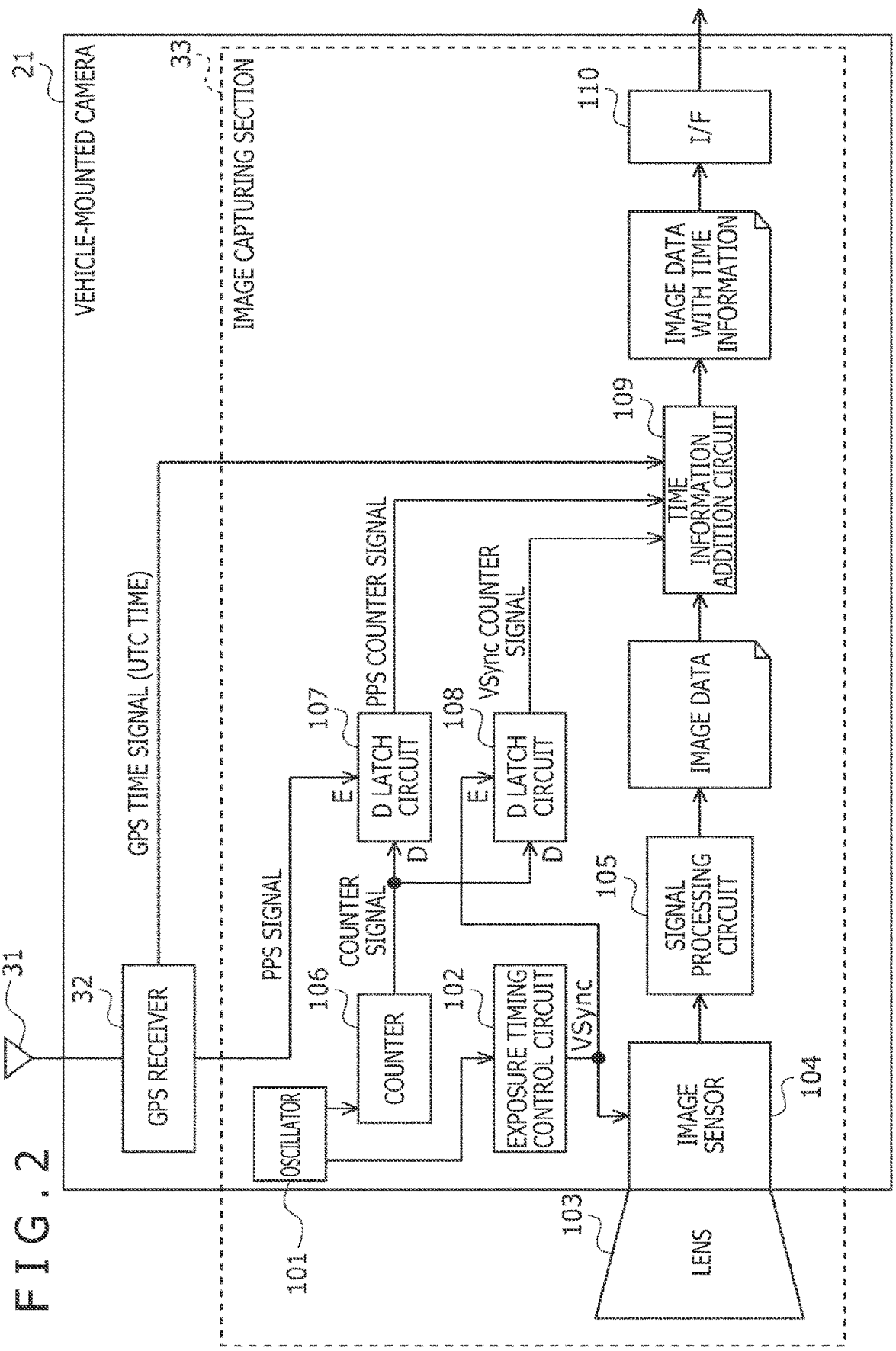
FIG. 2 is a block diagram depicting a configuration example of a vehicle-mounted camera.
Figure 4:
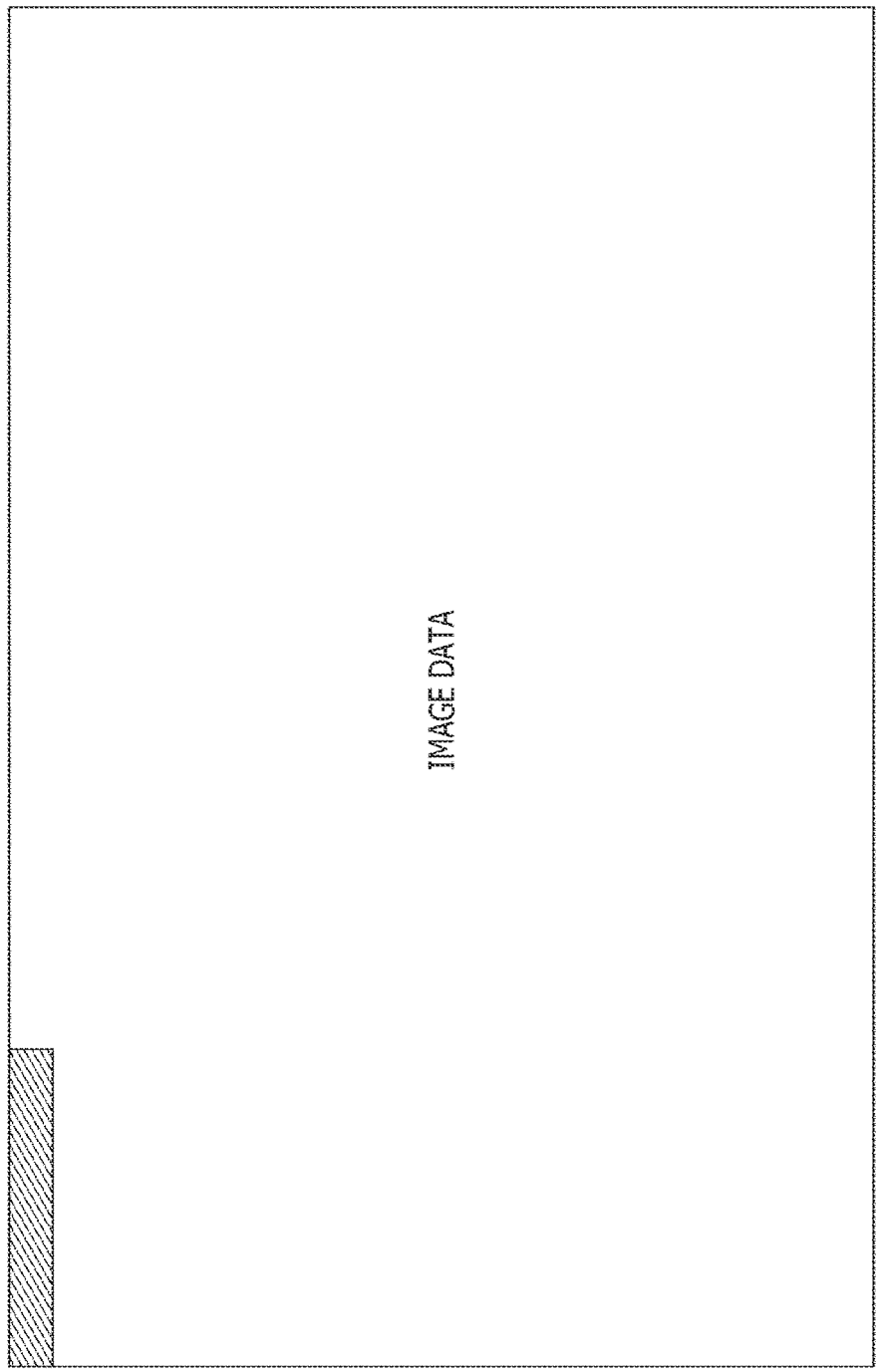
FIG. 4 is a diagram depicting an example of a position where image capturing time information is embedded.

Modes for carrying out the present technology will be described below. The description is given in the following order.

1. First Embodiment (example in which a vehicle-mounted camera and a host each include a GPS receiver)
2. Second Embodiment (example in which the vehicle-mounted camera and a sensing unit each include the GPS receiver)
3. Third Embodiment (example in which only the vehicle-mounted camera includes the GPS receiver)
4. Fourth Embodiment (example in which the GPS receiver is externally provided)
5. Modified Examples
6. Others 1. First Embodiment First, with reference to FIGS. 1 to 4, a first embodiment of the present technology will be described.

<Configuration Example of Vehicle-Mounted System 11>

FIG. 1 is a block diagram depicting a vehicle-mounted system 11 to which the present technology is applied.

The vehicle-mounted system 11 is provided in a vehicle 1. The vehicle-mounted system 11 captures images of the surroundings or the inside of the vehicle 1 and executes image processing such as object recognition on the basis of image data of the obtained images.

The vehicle-mounted system 11 includes a vehicle-mounted camera 21, a host 22, and a sensing unit 23. The vehicle-mounted camera 21 and the sensing unit 23 are connected to each other by a dedicated communication line. The host 22 and the sensing unit 23 are connected to each other by Ethernet.

The vehicle-mounted camera 21 includes an antenna 31, a GPS (Global Positioning System) receiver 32, and an image capturing section 33.

The GPS receiver 32 receives a GPS signal from a GPS satellite via the antenna 31. The GPS receiver 32 generates a GPS time signal that includes the time of the GPS (hereinafter referred to as the GPS time) included in the GPS signal, and supplies the GPS signal to the image capturing section 33. The GPS time is synchronous with UTC (Coordinated Universal Time) and is updated in a one-second cycle.

Additionally, the GPS receiver 32 generates a PPS (Pulse Per Second) signal having a pulse shape and synchronizing with the GPS time, and supplies the PPS signal to the image capturing section 33. The PPS signal is output in a one-second cycle each time the GPS time is updated.

The image capturing section 33 captures images of the surroundings or the inside of the vehicle 1. Additionally, on the basis of the GPS time signal and the PPS signal, the image capturing section 33 generates image capturing time information that is used to calculate the image capturing time. The image capturing section 33 adds image capturing time information to image data of each frame obtained by capturing images, and supplies the resultant data to the sensing unit 23.

The host 22 includes an antenna 41, a GPS receiver 42, and a master clock 43.

Similarly to the GPS receiver 32, the GPS receiver 42 receives the GPS signal from the GPS satellite via the antenna 41 and supplies the GPS time signal and the PPS signal to the master clock 43.

The master clock 43 generates reference time data that indicates a reference time used as a reference for processing of each section in the vehicle 1, and outputs the reference time data. Additionally, the master clock 43 synchronizes the reference time with the GPS time on the basis of the GPS time signal and the PPS signal.

The sensing unit 23 includes a local clock 51, a time control section 52, and an image processing section 53.

The local clock 51 generates local time data that indicates a reference for processing in the sensing unit 23, and outputs the local time data.

The time control section 52 synchronizes the local time of the local clock 51 with the reference time of the master clock 43 of the host 22 according to the PTP (Precision Time Protocol). This makes the local time synchronous with the GPS time.

Additionally, on the basis of image capturing time information added to the image data, the time control section 52 calculates the image capturing time of the image data of each frame.

The image processing section 53 executes image processing such as object recognition on the basis of image data. At this time, the image processing section 53 executes image processing as necessary by using the local time of the local clock 51 and the image capturing time calculated by the time control section 52.

<Configuration Example of Vehicle-Mounted Camera 21>

FIG. 2 is a block diagram depicting a configuration example of the vehicle-mounted camera 21 to which the present technology is applied.

The vehicle-mounted camera 21 includes the antenna 31, the GPS receiver 32, and the image capturing section 33 as described above. The image capturing section 33 includes an oscillator 101, an exposure timing control circuit 102, a lens 103, an image sensor 104, a signal processing circuit 105, a counter 106, a D latch circuit 107, a D latch circuit 108, a time information addition circuit 109, and an I/F (interface) circuit 110.

The oscillator 101 generates a clock signal in a predetermined cycle, and supplies the clock signal to the exposure timing control circuit 102 and the counter 106.

The exposure timing control circuit 102 generates a VSync (vertical synchronizing signal) on the basis of the clock signal, and supplies the VSync to the image sensor 104 and the D latch circuit 108.

The lens 103 forms light from a subject, on a light receiving surface of the image sensor 104.

The image sensor 104 starts exposure at a timing synchronous with the VSync to capture images of a subject (for example, the surroundings or the inside of the vehicle 1), and supplies image data of the obtained images to the signal processing circuit 105.

The signal processing circuit 105 executes predetermined signal processing such as white balance adjustment and noise reduction on the image data, and supplies the time information addition circuit 109 with the image data resulting from the signal processing.

The counter 106 updates a counter value in synchronism with the clock signal in a cycle shorter than the cycle of the VSync. The counter 106 supplies the D latch circuit 107 and the D latch circuit 108 with a counter signal indicating the counter value.

The D latch circuit 107 holds the counter value from the counter 106 (hereinafter referred to as the PPS counter value) when the GPS receiver 32 outputs the PPS signal (more technically, when the PPS signal is input to the D latch circuit 107). Additionally, the D latch circuit 107 supplies the time information addition circuit 109 with a PPS counter signal that indicates the PPS counter value held by the D latch circuit 107.

The D latch circuit 108 holds the counter value from the counter 106 (hereinafter referred to as the VSync counter value) when the exposure timing control circuit 102 outputs the VSync (more technically, when the VSync is input to the D latch circuit 108). Additionally, the D latch circuit 108 supplies the time information addition circuit 109 with a VSync counter signal that indicates the VSync counter value held by the D latch circuit 108.

The time information addition circuit 109 generates image capturing time information including the PPS counter value, the VSync counter value, and the GPS time. Additionally, the time information addition circuit 109 adds the image capturing time information to the image data of each frame supplied from the image sensor 104. Then, the time information addition circuit 109 supplies the image data with the image capturing time information (hereinafter referred to as the image data with time information) to the I/F circuit 110.

The I/F circuit 110 supplies the image data with time information to the sensing unit 23.

<Processing of Vehicle-Mounted Camera 21>

Now, with reference to a timing chart in FIG. 3, processing of the vehicle-mounted camera 21 will be described. The timing chart in FIG. 3 depicts a timing chart for the PPS signal, the GPS time signal, the VSync, the counter value, the PPS counter value, the VSync counter value, and the image capturing time information.

Note that, in this example, for easy-to-understand description, the VSync is output four times within one second but that the VSync is more frequently output in practice.

At a time t0, the GPS time included in the GPS signal received by the GPS receiver 32 is updated to a UTC time A. Thus, the GPS time included in the GPS time signal supplied from the GPS receiver 32 to the time information addition circuit 109 is updated to the UTC time A. Additionally, in synchronism with the update of the GPS time, the PPS signal supplied from the GPS receiver 32 to the D latch circuit 107 rises.

At a time t1, the PPS signal supplied from the GPS receiver 32 to the D latch circuit 107 falls. At the timing when the PPS signal falls, the D latch circuit 107 holds a counter value n included in the counter signal supplied from the counter 106. Thus, the PPS counter value of the PPS counter signal is updated to the value n, the PPS counter signal being supplied from the D latch circuit 107 to the time information addition circuit 109.

At a time t2, the VSync supplied from the exposure timing control circuit 102 to the image sensor 104 and the D latch circuit 108 rises.

At a time t3, the VSync supplied from the exposure timing control circuit 102 to the image sensor 104 and the D latch circuit 108 falls. At the timing when the VSync falls, the D latch circuit 108 holds a counter value m included in the counter signal supplied from the counter 106. Thus, the VSync counter value of the VSync counter signal is updated to m, the VSync counter signal being supplied from the D latch circuit 108 to the time information addition circuit 109.

Additionally, the image sensor 104 starts exposing the next frame, that is, starts capturing the next frame image, in synchronism with the VSync. The image sensor 104 supplies image data of the obtained image to the time information addition circuit 109 via the signal processing circuit 105. The time information addition circuit 109 generates image capturing time information including the GPS time at the time t3, the PPS counter value, and the VSync counter value. In other words, the time information addition circuit 109 generates image capturing time information including the GPS time corresponding to the UTC time A, the PPS counter value n, and the VSync counter value m.

The time information addition circuit 109 generates image data with time information that includes the image capturing time information. For example, as depicted by a shaded portion in FIG. 4, the image capturing time information is embedded at an unnoticeable position such as the first position of the first row in the image data. The time information addition circuit 109 supplies the image data with time information to the sensing unit 23 via the I/F circuit 110.

At a time t4, the VSync rises as in the case of the time t2.

At a time t5, the VSync falls as in the case of the time t3. The D latch circuit 108 holds a counter value o included in the counter signal supplied from the counter 106, and updates, to the value o, the VSync counter value of the VSync counter signal supplied to the time information addition circuit 109.

Additionally, the image sensor 104 starts exposing the next frame in synchronism with the VSync, and supplies image data of the obtained image to the time information addition circuit 109 via the signal processing circuit 105. The time information addition circuit 109 generates image capturing time information including the GPS time corresponding to the UTC time A, the PPS counter value n, and the VSync counter value o. The time information addition circuit 109 adds the image capturing time information to the image data, and supplies the image data with time information that includes the image capturing time information, to the sensing unit 23 via the I/F circuit 110.

At a time t6, the VSync rises as in the case of the time t2.

At a time t7, the VSync falls as in the case of the time t3. The D latch circuit 108 holds a counter value p included in the counter signal supplied from the counter 106, and updates, to the value p, the VSync counter value of the VSync counter signal supplied to the time information addition circuit 109.

Additionally, the image sensor 104 starts exposing the next frame in synchronism with the VSync, and supplies image data of the obtained image to the time information addition circuit 109 via the signal processing circuit 105. The time information addition circuit 109 generates image capturing time information including the GPS time corresponding to the UTC time A, the PPS counter value n, and the VSync counter value p. The time information addition circuit 109 adds the image capturing time information to the image data, and supplies the image data with time information that includes the image capturing time information, to the sensing unit 23 via the I/F circuit 110.

At a time t8, the VSync rises as in the case of the time t2.

At a time t9, the VSync falls as in the case of the time t3. The D latch circuit 108 holds a counter value q included in the counter signal supplied from the counter 106, and updates, to the value q, the VSync counter value of the VSync counter signal supplied to the time information addition circuit 109.

Additionally, the image sensor 104 starts exposing the next frame in synchronism with the VSync, and supplies image data of the obtained image to the time information addition circuit 109 via the signal processing circuit 105. The time information addition circuit 109 generates image capturing time information including the GPS time corresponding to the UTC time A, the PPS counter value n, and the VSync counter value q. The time information addition circuit 109 adds the image capturing time information to the image data, and supplies the image data with time information that includes the image capturing time information, to the sensing unit 23 via the I/F circuit 110.

At a time t10, as in the case of the time t0, the GPS time included in the GPS signal received by the GPS receiver 32 is updated to a UTC time B. Thus, the GPS time included in the GPS time signal supplied from the GPS receiver 32 to the time information addition circuit 109 is updated to the UTC time B. Additionally, the PPS signal supplied from the GPS receiver 32 to the D latch circuit 107 rises in synchronism with the update of the GPS time signal.

At a time t11, the PPS signal falls as in the case of the time t1. The D latch circuit 107 holds a counter value r included in the counter signal, and updates, to the value r, the PPS counter value of the PPS counter signal supplied to the time information addition circuit 109.

At a time t12, the VSync rises as in the case of the time t2.

At a time t13, the VSync falls as in the case of the time t3. The D latch circuit 108 holds a counter value s included in the counter signal supplied from the counter 106, and updates, to the value s, the VSync counter value of the VSync counter signal supplied to the time information addition circuit 109.

Additionally, the image sensor 104 starts exposing the next frame in synchronism with the VSync, and supplies image data of the obtained image to the time information addition circuit 109 via the signal processing circuit 105. The time information addition circuit 109 generates image capturing time information including the GPS time corresponding to the UTC time B, the PPS counter value r, and the VSync counter value s. The time information addition circuit 109 adds the image capturing time information to the image data, and supplies the image data with time information that includes the image capturing time information, to the sensing unit 23 via the I/F circuit 110.

At a time t14, the VSync rises as in the case of the time t2.

At a time t15, the VSync falls as in the case of the time t3. The D latch circuit 108 holds a counter value t included in the counter signal supplied from the counter 106, and updates, to the value t, the VSync counter value of the VSync counter signal supplied to the time information addition circuit 109.

Additionally, the image sensor 104 starts exposing the next frame in synchronism with the VSync, and supplies image data of the obtained image to the time information addition circuit 109 via the signal processing circuit 105. The time information addition circuit 109 generates image capturing time information including the GPS time corresponding to the UTC time B, the PPS counter value r, and the VSync counter value t. The time information addition circuit 109 adds the image capturing time information to the image data, and supplies the image data with time information that includes the image capturing time information, to the sensing unit 23 via the I/F circuit 110.

At a time t16, the VSync rises as in the case of the time t2.

At a time t17, the VSync falls as in the case of the time t3. The D latch circuit 108 holds a counter value u included in the counter signal supplied from the counter 106, and updates, to the value u, the VSync counter value of the VSync counter signal supplied to the time information addition circuit 109.

Additionally, the image sensor 104 starts exposing the next frame in synchronism with the VSync, and supplies image data of the obtained image to the time information addition circuit 109 via the signal processing circuit 105. The time information addition circuit 109 generates image capturing time information including the GPS time corresponding to the UTC time B, the PPS counter value r, and the VSync counter value u. The time information addition circuit 109 adds the image capturing time information to the image data, and supplies the image data with time information that includes the image capturing time information, to the sensing unit 23 via the I/F circuit 110.

Subsequently, similar processing is repeatedly executed.

In this regard, the time control section 52 of the sensing unit 23 calculates the image capturing time of each image data on the basis of the image capturing time information, by using the following Equation (1).

$$\text{Image capturing time} = \text{GPS time} + (V\text{Sync count value} - \text{PPS count value}) \times T \quad (1)$$

T denotes the cycle of the counter 106.

For example, the image processing section 53 calculates the image capturing time t3, the image capturing time t5, the image capturing time t7, the image capturing time t9, the image capturing time t13, the image capturing time t15, and the image capturing time t17 by using the following Equations (2) to (8).

$$t3 = \text{UTC time } A + (m-n) \times T \quad (2)$$

$$t5 = \text{UTC time } A + (o-n) \times T \quad (3)$$

$$t7 = \text{UTC time } A + (p-n) \times T \quad (4)$$

$$t9 = \text{UTC time } A + (q-n) \times T \quad (5)$$

$$t13 = \text{UTC time } B + (s-r) \times T \quad (6)$$

$$t15 = \text{UTC time } B + (t-r) \times T \quad (7)$$

$$t17 = \text{UTC time } B + (u-r) \times T \quad (8)$$

As described above, the accurate image capturing time of the image data of each frame can be determined without provision of a real-time clock or a correction circuit for correcting the real-time clock in the vehicle-mounted camera 21. Consequently, the circuit of the vehicle-mounted camera 21 is simplified, reducing the design cost and the manufacturing cost.

Additionally, the sensing unit 23 executes image processing such as object recognition and is thus assumed to include processors having higher computing power than processors in the vehicle-mounted camera 21. Consequently, even if the sensing unit 23 is configured to calculate the image capturing time as described above, this configuration has substantially no adverse effect on the processing load on the sensing unit 23.

Further, the determined image capturing time is expressed in GPS time (UTC time), and the reference time of the master clock 43 synchronizes with the GPS time (UTC time). Consequently, the determined image capturing time is based on the reference time of the master clock 43 without any correction.

Additionally, VSync need not be synchronized with the GPS time or the like, and thus, exposure timing (image capturing timing) is easily controlled and has an increased degree of freedom for exposure timing (image capturing timing).

Moreover, even in a case where no GPS signal can be received in a tunnel or the like, the image capturing time information can be accurately determined on the basis of the GPS time when the last GPS signal is received and the corresponding PPS counter value and of the VSync counter value.

2. Second Embodiment

Figure 5:
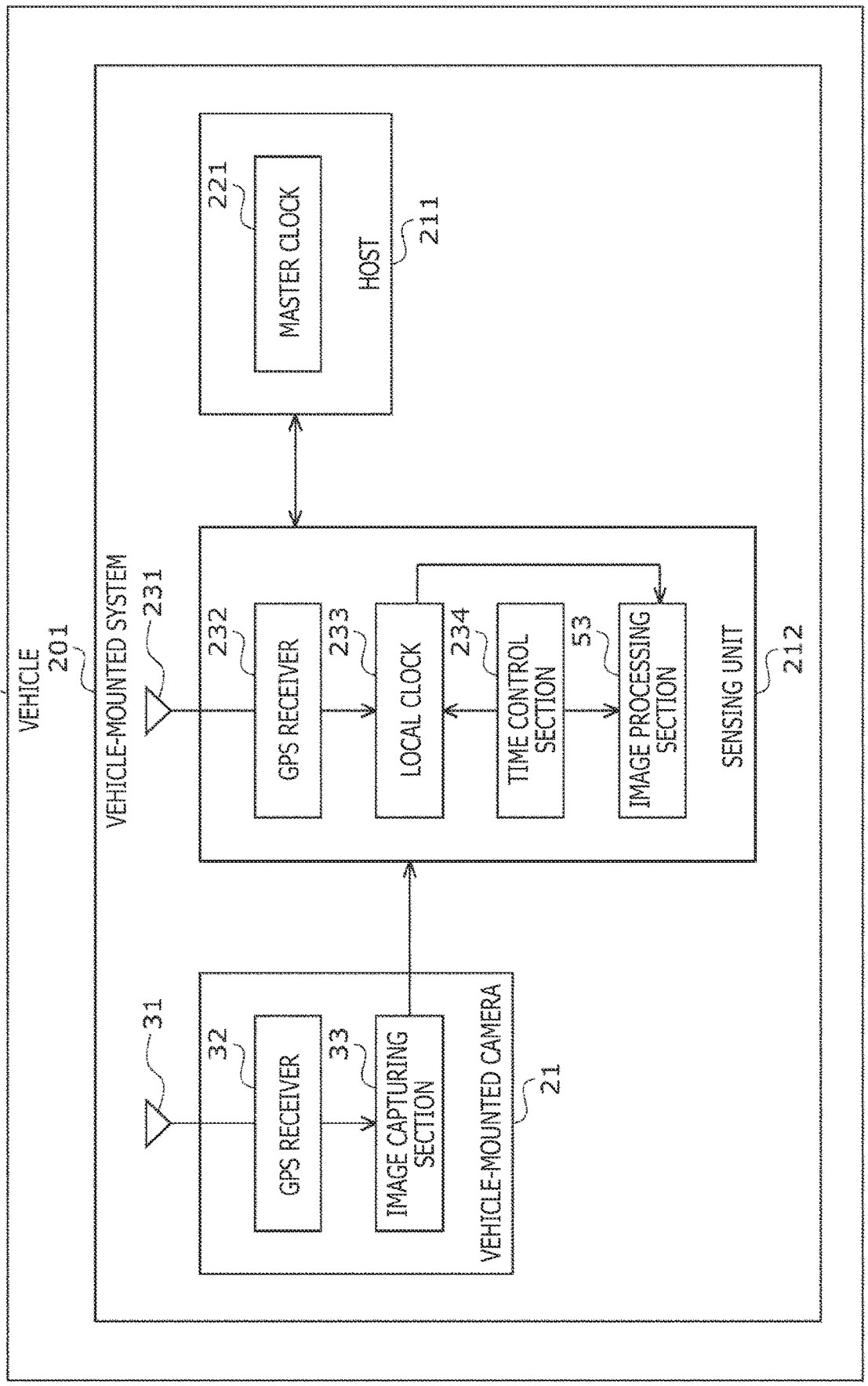
FIG. 5 is a block diagram depicting a second embodiment of the vehicle-mounted system to which the present technology is applied.

FIG. 5 illustrates a configuration example of a vehicle-mounted system 201 that is a second embodiment of the vehicle-mounted system to which the present technology is applied. Note that, in FIG. 5, components corresponding to those of the vehicle-mounted system 11 in FIG. 1 are denoted by the same reference signs, and description of these components is appropriately omitted.

The vehicle-mounted system 201 differs significantly from the vehicle-mounted system 11 in that, instead of a host 211, a sensing unit 212 includes a GPS receiver 232.

Specifically, the vehicle-mounted system 201 is similar to the vehicle-mounted system 11 in that both vehicle-mounted systems include the vehicle-mounted camera 21, but differs from the vehicle-mounted system 11 in that the vehicle-mounted system 201 includes the host 211 and the sensing unit 212 instead of the host 22 and the sensing unit 23.

The host 211 includes a master clock 221.

The sensing unit 212 is similar to the sensing unit 23 in FIG. 1 in that both sensing units include the image processing section 53. However, the sensing unit 212 differs from the sensing unit 23 in that the sensing unit 212 includes a local clock 233 and a time control section 234 instead of the local clock 51 and the time control section 52 and includes the antenna 231 and the GPS receiver 232. The vehicle-mounted camera 21 is connected to the sensing unit 212 by a dedicated connection line. The host 211 and the sensing unit 212 are connected to each other by Ethernet.

Similarly to the GPS receiver 32, the GPS receiver 232 receives the GPS signal from the GPS satellite via the antenna 231 and supplies the GPS time signal and the PPS signal to the local clock 233.

When started, the local clock 233 synchronizes the local time with the GPS time included in the GPS time signal.

On the basis of a PTP protocol, the time control section 234 detects a time difference between the reference time of the master clock 221 of the host 211 and the local time of the local clock 233. Additionally, on the basis of the PTP protocol, the time control section 234 synchronizes the local time of the local clock 233 with the reference time of the master clock 221.

Further, the time control section 234 uses the Equation (1) described above to calculate the image capturing time of image data supplied from the vehicle-mounted camera 21. Additionally, the time control section 234 corrects the calculated image capturing time on the basis of the time difference between the master clock 221 and the local clock 233. Thus, the image capturing time of the image data of each frame is corrected to a time based on the reference time of the master clock 221.

In such a manner, in a case where the reference time of the master clock 221 does not synchronize with the GPS time, the local time of the local clock 233 and the image capturing time of the image data are synchronized with the reference time.

3. Third Embodiment

Figure 6:
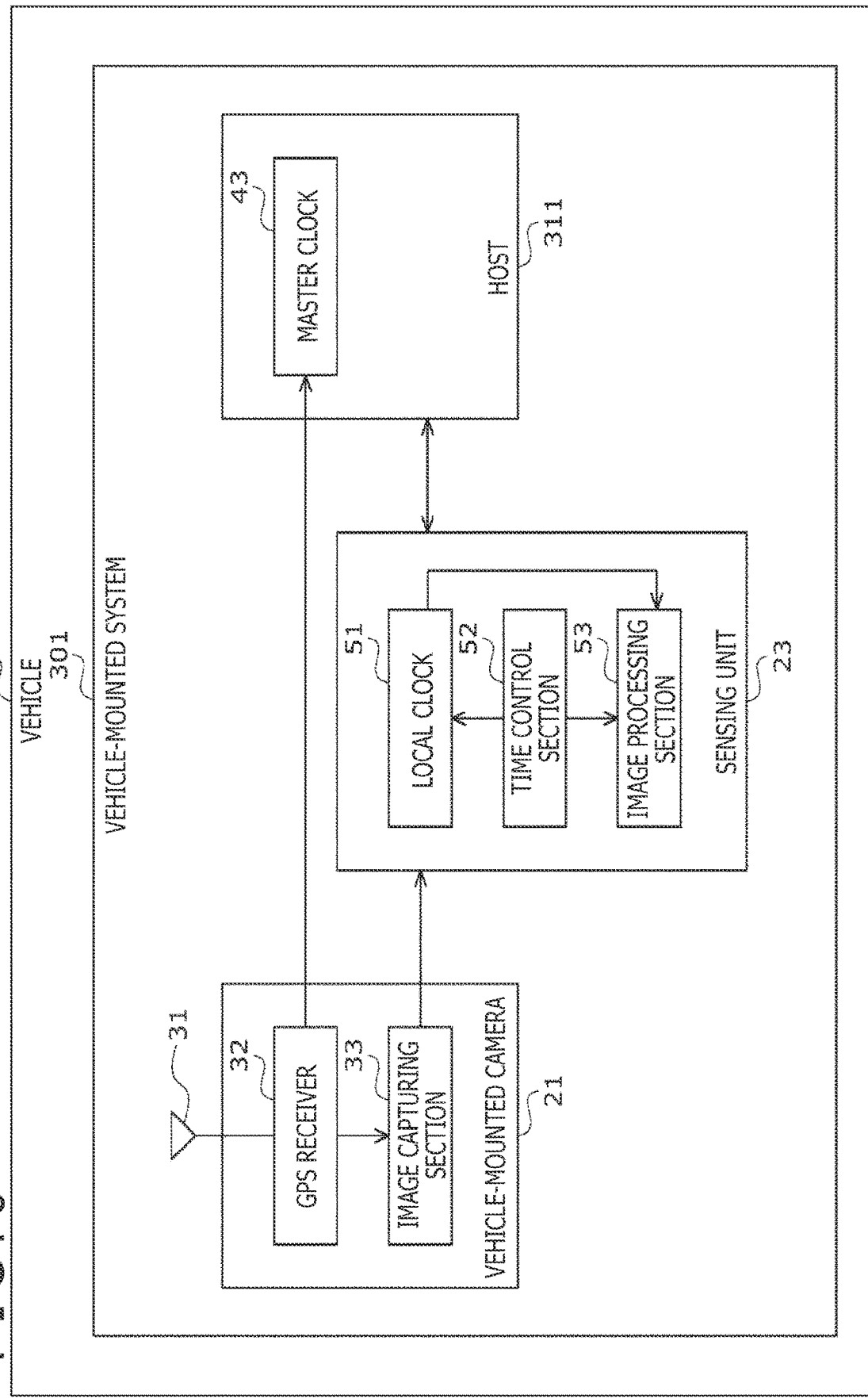
FIG. 6 is a block diagram depicting a third embodiment of the vehicle-mounted system to which the present technology is applied.

FIG. 6 depicts a configuration example of a vehicle-mounted system 301 that is a third embodiment of the vehicle-mounted system to which the present technology is applied. Note that, in FIG. 6, components corresponding to those of the vehicle-mounted system 11 in FIG. 1 are denoted by the same reference signs, and description of these components is appropriately omitted.

The vehicle-mounted system 301 differs significantly from the vehicle-mounted system 11 in that a host 311 includes no GPS receiver.

Specifically, the vehicle-mounted system 301 is similar to the vehicle-mounted system 11 in that both vehicle-mounted systems include the vehicle-mounted camera 21 and the sensing unit 23, but differs from the vehicle-mounted system 11 in that the vehicle-mounted system 301 includes the host 311 instead of the host 22. The vehicle-mounted camera 21 is connected to the host 311 and the sensing unit 23 by a dedicated connection line. The host 311 and the sensing unit 23 are connected to each other by Ethernet.

The host 311 includes the master clock 43.

The GPS receiver 32 of the vehicle-mounted camera 21 supplies the GPS time signal and the PPS signal to the master clock 43 of the host 311.

On the basis of the GPS time signal and the PPS signal from the GPS receiver 32, the master clock 43 synchronizes the reference time with the GPS time.

In such a manner, in the third embodiment, the number of GPS receivers can be reduced.

4. Fourth Embodiment

Figure 7:
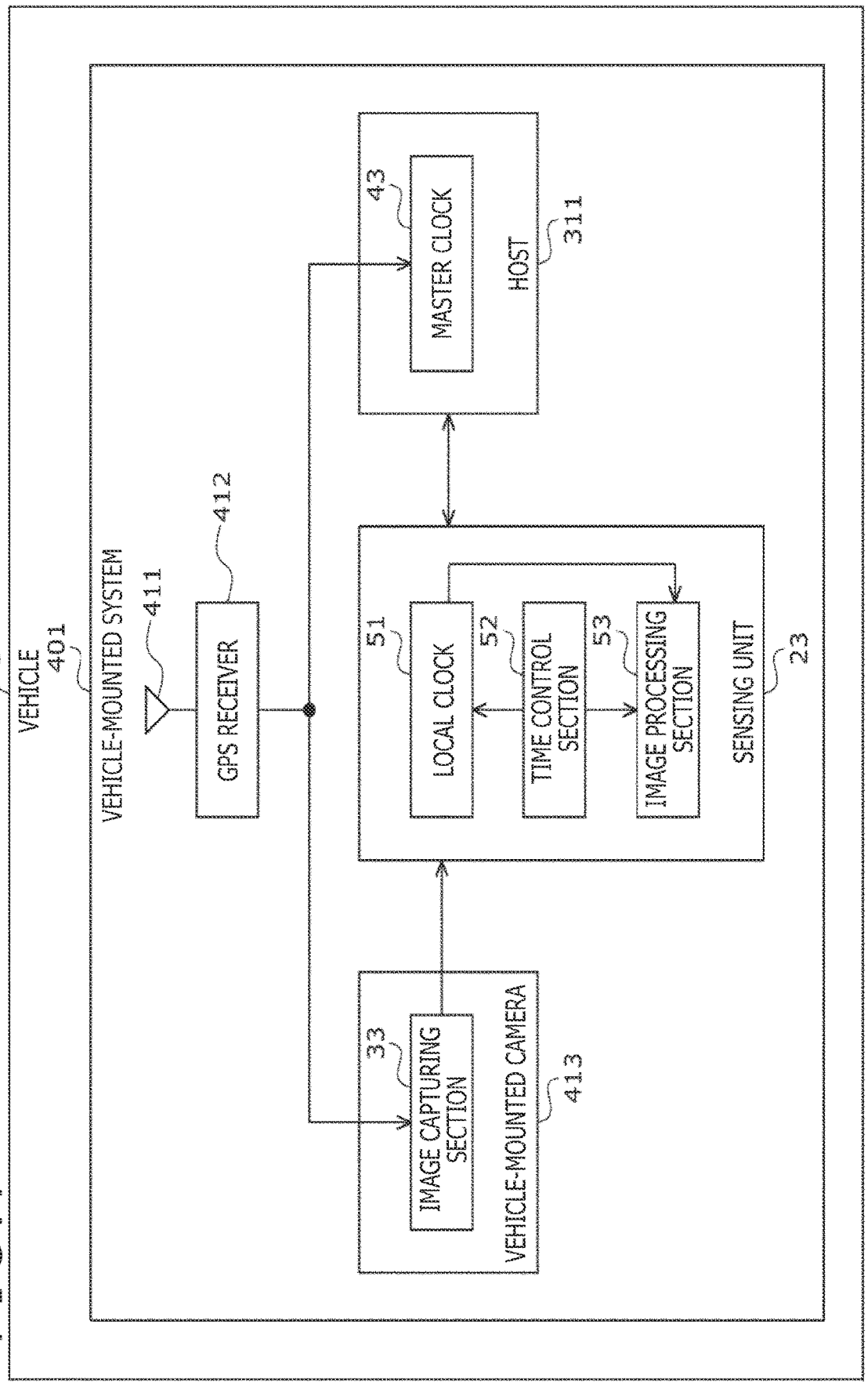
FIG. 7 is a block diagram depicting a fourth embodiment of the vehicle-mounted system to which the present technology is applied.

FIG. 7 depicts a configuration example of a vehicle-mounted system 401 that is a fourth embodiment of the vehicle-mounted system to which the present technology is applied. Note that, in FIG. 7, components corresponding to those of the vehicle-mounted system 11 in FIG. 1 are denoted by the same reference signs, and description of these components is appropriately omitted.

The vehicle-mounted system 401 differs significantly from the vehicle-mounted system 301 in FIG. 6 in that a GPS receiver 412 is provided outside the host 311 and a vehicle-mounted camera 413.

Specifically, the vehicle-mounted system 401 is similar to the vehicle-mounted system 301 in that both vehicle-mounted systems include the sensing unit 23 and the host 311. However, the vehicle-mounted system 401 differs from the vehicle-mounted system 301 in that the vehicle-mounted system 401 includes the vehicle-mounted camera 413 instead of the vehicle-mounted camera 21 and includes an antenna 411 and the GPS receiver 412.

The vehicle-mounted camera 413 is similar to the vehicle-mounted camera 21 in FIG. 6 in that both vehicle-mounted cameras include the image capturing section 33, but differs from the vehicle-mounted camera 21 in that the vehicle-mounted camera 413 does not include the antenna 31 and the GPS receiver 32.

Similarly to the GPS receiver 32 in FIG. 1, the GPS receiver 412 receives the GPS signal from the GPS satellite via the antenna 411, and supplies the GPS time signal and the PPS signal to the image capturing section 33 of the vehicle-mounted camera 413 and the master clock 43 of the host 311.

On the basis of the GPS time signal and the PPS signal from the GPS receiver 412, the image capturing section 33 generates and adds image capturing time information to the image data as described above.

On the basis of the GPS time signal and the PPS signal from the GPS receiver 412, the master clock 43 synchronizes the reference time with the GPS time.

Thus, in the fourth embodiment, the number of GPS receivers can be reduced as in the case of the third embodiment. Additionally, for example, the GPS receiver 412 is independently provided, facilitating share of the GPS time signal and the PPS signal among multiple apparatuses.

5. Modified Examples

Modified examples of the abovementioned embodiments of the present technology will be described.

In the present technology, it is also possible to use a GNSS (Global Navigation Satellite System) time based on a GNSS signal from a GNSS satellite, instead of the GPS.

Additionally, in the example described above, the image capturing time information is embedded in the image data. However, any other method may be used to add the image capturing time information to the image data. For example, the image capturing time information may be inserted into header information of the image data, or data may be generated by combining the image data with the image capturing time information. Further, for example, the image data and the image capturing time information may be output as discrete data and may be associated with each other by using an ID or the like.

Moreover, for example, the image capturing time information may include position information based on the GNSS signal.

Additionally, for example, in the vehicle-mounted camera 21 or the vehicle-mounted camera 413, the image capturing time may be calculated, and the image capturing time information including the calculated image capturing time may be added to the image data.

Further, the present technology can be applied to a case where a sensing time of a sensor other than the image sensor, such as a sensor used for LiDAR (Light Detection and Ranging, Laser Imaging Detection and Ranging) or a sensor used for object recognition with a radar, is to be determined. In this case, sensing time information including similar information to the abovementioned image capturing time information is added to each piece of sensor data. Additionally, instead of the VSync counter value, a counter value that is obtained when a control signal for controlling a sensing timing of a sensor is output is used.

Note that the start time of sensing need not necessarily be determined as a sensing time and that any other time may be determined as a sensing time. For example, for the vehicle-mounted camera 21 described above, instead of the time when exposure is started, the time when the exposure is ended may be determined as the image capturing time.

The present technology can also be applied to mobile bodies other than vehicles. For example, mobile bodies are assumed to be motor cycles, bicycles, personal transporters, airplanes, ships, construction machines, agricultural machines (tractors), and the like. Additionally, the mobile bodies to which the present technology can be applied include mobile bodies that are not boarded but are remotely driven (operated) by a user, such as drones and robots.

Further, the present technology can be applied to systems and apparatuses including a GNSS receiver and a sensor, as well as to the mobile bodies. The present technology can also be applied to, for example, information processing terminals such as smartphones, tablet terminals, cellular phones, and personal computer, surveillance camera systems, and the like.

Additionally, the present technology can also be applied to systems and apparatuses including multiple sensors. Multiple sensors may be of the same type or of different types. Then, the method described above is used to accurately determine the sensing time of the sensing data of each sensor. This allows pieces of sensor data of multiple sensors to be easily synchronized with one another.

For example, pieces of image data of images captured by multiple vehicle-mounted cameras can be synchronized with one another. Additionally, in a sensor fusion including different types of sensors, pieces of sensor data of the sensors can be synchronized with one another. Further, for example, in a case where pieces of image data of images captured by different cameras, smartphones, or the like are uploaded to a server (for example, a cloud), pieces of the uploaded image data can be synchronized with one another.

6. Others

<Configuration Example of Computer>

The series of processing operations described above can be executed by hardware or by software. In a case where the series of processing operations is executed by software, programs constituting the software are installed in a computer. Here, examples of the computer include a computer integrated into dedicated hardware, and, for example, a general-purpose personal computer or the like which can execute various functions when various programs are installed in the computer.

FIG. 8 is a block diagram depicting a configuration example of hardware of a computer that executes the series of processing operations described above according to a program.

A computer 1000 includes a CPU (Central Processing Unit) 1001, a ROM (Read Only Memory) 1002, and a RAM (Random Access Memory) 1003 that are connected together by a bus 1004.

An input/output interface 1005 is further connected to the bus 1004. The input/output interface 1005 is connected to an input section 1006, an output section 1007, a recording section 1008, a communication section 1009, and a drive 1010.

The input section 1006 includes an input switch, a button, a microphone, an imaging element, and the like. The output section 1007 includes a display, a speaker, and the like. The recording section 1008 includes a hard disk, a nonvolatile memory, or the like. The communication section 1009 includes a network interface or the like. The drive 1010 drives a removable medium 1011 such as a magnetic disk, an optical disc, a magneto-optical disk, or a semiconductor memory.

In the computer 1000 configured as described above, the CPU 1001 executes the series of processing operations described above by, for example, loading programs recorded in the recording section 1008 into the RAM 1003 via the input/output interface 1005 and the bus 1004 and executing the programs.

The programs to be executed by the computer 1000 (CPU 1001) can be provided, for example, by being recorded in the removable medium 1011, which is used as a package medium. Alternatively, the programs can be provided via a wired or wireless transmission medium such as a local area network, the Internet, or digital satellite broadcasting.

In the computer 1000, with the removable medium 1011 mounted in the drive 1010, the programs can be installed in the recording section 1008 via the input/output interface 1005. Alternatively, the programs can be received by the communication section 1009 via the wired or wireless transmission medium and installed in the recording section 1008. Otherwise, the programs can be pre installed in the ROM 1002 or the recording section 1008.

Note that the program executed by the computer may be a program causing processing operations to be executed in the chronological order described herein, or may be a program causing the processing operations to be executed in parallel or at required timings such as a timing when the program is invoked.

Additionally, the system, as used herein, means a set of multiple components (apparatuses, modules (parts), or the like) regardless of whether or not all of the components are located in an identical housing. Consequently, the system refers both to multiple apparatuses placed in separate housings and connected together via the network and to one apparatus including multiple modules placed in one housing.

Further, the embodiments of the present technology are not limited to those described above, and various modifications can be made to the embodiments without departing from the spirits of the present technology.

For example, the present technology can be implemented in a cloud computing configuration in which one function is shared and is jointly executed by multiple apparatuses via the network.

Additionally, the steps described above with reference to the flowchart can be executed by one apparatus or can be shared and executed by multiple apparatuses.

Further, in a case where one step includes multiple processing operations, the multiple processing operations included in the one step can be executed by one apparatus or can be shared and executed by multiple apparatuses.

<Examples of Combination of Configurations>

The present technology can be implemented in the configurations described below.

(1)

An information processing apparatus including:
 a control circuit that outputs a control signal for controlling a sensing timing of a sensor;
 a counter that updates a counter value in a predetermined cycle; and
 an addition circuit that adds, to sensor data output from the sensor, sensing time information including a first counter value, a second counter value, and a GNSS (Global Navigation Satellite System) time in a GNSS, the first counter value being obtained when the control signal is output from the control circuit, the second counter value being obtained when a pulse signal synchronous with the GNSS time is output from a GNSS receiver.

(2)

The information processing apparatus according to (1) described above, further including:
 the sensor.

(3)

The information processing apparatus according to (2) described above, in which
 the sensor performs sensing of surroundings or an inside of a vehicle.

(4)

The information processing apparatus according to (2) or (3) described above, in which
 the sensor includes an image sensor,
 the control signal includes a vertical synchronizing signal, and
 the sensor data includes image data.

(5)

The information processing apparatus according to any one of (1) to (4) described above, further including:
 the GNSS receiver.

(6)

The information processing apparatus according to (5) described above, in which
 the sensor performs sensing of the surroundings or the inside of the vehicle, and
 the GNSS receiver supplies the pulse signal and a signal indicating the GNSS time to another information processing apparatus including a master clock for the vehicle.

(7)
The information processing apparatus according to any one of (1) to (6) described above, further including:
a time control section that calculates a sensing time of the sensor data on the basis of the sensing time information.

(8)
An information processing method including:
by an information processing apparatus,
outputting a control signal for controlling a sensing timing of a sensor;
updating a counter value in a predetermined cycle; and
adding, to sensor data output from the sensor, sensing time information including a first counter value, a second counter value, and a GNSS (Global Navigation Satellite System) time in a GNSS, the first counter value being obtained when the control signal is output from the control circuit, the second counter value being obtained when a pulse signal synchronous with the GNSS time is output from a GNSS receiver.

(9)
A program for a computer of an information processing apparatus including a control circuit that outputs a control signal for controlling a sensing timing of a sensor and a counter that updates a counter value in a predetermined cycle, the program causing the computer to execute processing of:
adding, to sensor data output from the sensor, sensing time information including a first counter value, a second counter value, and a GNSS (Global Navigation Satellite System) time in a GNSS, the first counter value being obtained when the control signal is output from the control circuit, the second counter value being obtained when a pulse signal synchronous with the GNSS time is output from a GNSS receiver.

(10)
An information processing apparatus including:
a time control section that calculates a sensing time of sensor data output from a sensor, on the basis of sensing time information output from another information processing apparatus including a control circuit that outputs a control signal for controlling a sensing timing of the sensor and a counter that updates a counter value in a predetermined cycle, the sensing time information including a first counter value, a second counter value, and a GNSS (Global Navigation Satellite System) time in a GNSS, the first counter value being obtained when the control signal is output, the second counter value being obtained when a pulse signal synchronous with the GNSS time is output from a first GNSS receiver.

(11)
The information processing apparatus according to (10) described above, in which
the time control section obtains the sensing time by calculating the GNSS time+(the first counter value−the second counter value)×a cycle of the counter.

(12)
The information processing apparatus according to (10) or (11) described above, in which
the sensor performs sensing of surroundings or an inside of a vehicle.

(13)
The information processing apparatus according to (12) described above, further including:
an image processing section that executes, on the basis of the sensor data, processing of recognizing an object around or inside the vehicle.

(14)
The information processing apparatus according to any one of (12) to (13) described above, further including:
a clock, in which
the time control section synchronizes a time of the clock with a time of a master clock of the vehicle.

(15)
The information processing apparatus according to (14) described above, in which
the sensing time is corrected on the basis of a time difference between the time of the master clock and the time of the clock that has not been synchronized with the time of the master clock.

(16)
The information processing apparatus according to (15) described above, further including:
a second GNSS receiver that receives a GNSS signal, in which
the clock synchronizes with the GNSS time on the basis of a signal that is output from the second GNSS receiver and that includes the GNSS time.

(17)
The information processing apparatus according to any one of (10) to (16) described above, in which
the sensing time information is added to the sensor data.

(18)
The information processing apparatus according to any one of (10) to (17) described above, in which
the sensor includes an image sensor, and
the control signal includes a vertical synchronizing signal.

(19)
An information processing method including:
by an information processing apparatus,
calculating a sensing time of sensor data output from a sensor, on the basis of sensing time information output from another information processing apparatus including a control circuit that outputs a control signal for controlling a sensing timing of the sensor and a counter that updates a counter value in a predetermined cycle, the sensing time information including a first counter value, a second counter value, and a GNSS (Global Navigation Satellite System) time in a GNSS, the first counter value being obtained when the control signal is output, the second counter value being obtained when a pulse signal synchronous with the GNSS time is output from a GNSS receiver.

(20)
A program causing a computer to execute processing of:
calculating a sensing time of sensor data output from a sensor, on the basis of sensing time information output from another information processing apparatus including a control circuit that outputs a control signal for controlling a sensing timing of the sensor and a counter that updates a counter value in a predetermined cycle, the sensing time information including a first counter value, a second counter value, and a GNSS (Global Navigation Satellite System) time in a GNSS, the first counter value being obtained when the control signal is output, the second counter value being obtained when a pulse signal synchronous with the GNSS time is output from a GNSS receiver.

Note that the effects described herein are only illustrative and are not restrictive and that any other effect may be produced.

REFERENCE SIGNS LIST

1: Vehicle
11: Vehicle-mounted system

21: Vehicle-mounted camera
22: Host
23: Sensing unit
32: GPS receiver
33: Image capturing section
42: GPS receiver
43: Master clock
51: Local clock
52: Time control section
53: Image processing section
102: Exposure timing control circuit
104: Image sensor
106: Counter
107: D latch circuit
108: D latch circuit
109: Time information addition circuit
201: Vehicle-mounted system
211: Host
212: Sensing unit
221: Master clock
232: GPS receiver
233: Local clock
234: Time control section
301: Vehicle-mounted system
311: Host
401: Vehicle-mounted system
412: GPS receiver
413: Vehicle-mounted camera

The invention claimed is:

1. A first information processing apparatus, comprising:
a control circuit configured to output a control signal to control a sensing timing of a sensor;
a counter configured to update a counter value in a specific cycle; and
an addition circuit configured to add, to sensor data output from the sensor, sensing time information including a first counter value, a second counter value, and a GNSS (Global Navigation Satellite System) time in a GNSS, wherein
the first counter value is obtained when the control signal is output from the control circuit, and
the second counter value is obtained when a pulse signal synchronous with the GNSS time is output from a GNSS receiver.

2. The first information processing apparatus according to claim 1, further comprising:
the sensor.

3. The first information processing apparatus according to claim 2, wherein
the sensor is further configured to perform sensing of surroundings or an inside of a vehicle.

4. The first information processing apparatus according to claim 2, wherein
the sensor includes an image sensor,
the control signal includes a vertical synchronizing signal, and
the sensor data includes image data.

5. The first information processing apparatus according to claim 1, further comprising:
the GNSS receiver.

6. The first information processing apparatus according to claim 5, wherein
the sensor is further configured to perform sensing of surroundings or an inside of a vehicle, and
the GNSS receiver is further configured to supply the pulse signal and a signal including the GNSS time to a second information processing apparatus including a master clock for the vehicle.

7. The first information processing apparatus according to claim 1, further comprising:
a time control section configured to calculate a sensing time of the sensor data based on the sensing time information.

8. An information processing method, comprising:
by an information processing apparatus:
outputting a control signal for controlling a sensing timing of a sensor;
updating a counter value in a specific cycle; and
adding, to sensor data output from the sensor, sensing time information including a first counter value, a second counter value, and a GNSS (Global Navigation Satellite System) time in a GNSS, wherein
the first counter value is obtained when the control signal is output from a control circuit of the information processing apparatus, and
the second counter value is obtained when a pulse signal synchronous with the GNSS time is output from a GNSS receiver.

9. A non-transitory computer-readable medium having stored thereon, computer-executable instructions which, when executed by a computer of an information processing apparatus including a control circuit that outputs a control signal for controlling a sensing timing of a sensor and a counter that updates a counter value in a specific cycle, cause the computer to execute operations, the operations comprising:
adding, to sensor data output from the sensor, sensing time information including a first counter value, a second counter value, and a GNSS (Global Navigation Satellite System) time in a GNSS, wherein
the first counter value is obtained when the control signal is output from the control circuit, and
the second counter value is obtained when a pulse signal synchronous with the GNSS time is output from a GNSS receiver.

10. A first information processing apparatus, comprising:
a time control section configured to calculate a sensing time of sensor data output from a sensor, based on sensing time information output from a second information processing apparatus including a control circuit that outputs a control signal for controlling a sensing timing of the sensor and a counter that updates a counter value in a specific cycle, wherein
the sensing time information includes a first counter value, a second counter value, and a GNSS (Global Navigation Satellite System) time in a GNSS,
the first counter value is obtained when the control signal is output, and
the second counter value is obtained when a pulse signal synchronous with the GNSS time is output from a first GNSS receiver.

11. The first information processing apparatus according to claim 10, wherein
the time control section is configured to obtain the sensing time by calculating the GNSS time+(the first counter value−the second counter value)×the specific cycle of the counter.

12. The first information processing apparatus according to claim 10, wherein
the sensor performs sensing of surroundings or an inside of a vehicle.

13. The first information processing apparatus according to claim 12, further comprising:

an image processing section configured to execute, based on the sensor data, a process to recognize an object around or inside the vehicle.

14. The first information processing apparatus according to claim 12, further comprising:
a clock, wherein the time control section synchronizes a time of the clock with a time of a master clock of the vehicle.

15. The first information processing apparatus according to claim 14, wherein
the sensing time is corrected based on a time difference between the time of the master clock and the time of the clock that is not synchronized with the time of the master clock.

16. The first information processing apparatus according to claim 15, further comprising:
a second GNSS receiver is configured to receive a GNSS signal, wherein
the clock synchronizes with the GNSS time based on a signal that is output from the second GNSS receiver, and
the signal includes the GNSS time.

17. The first information processing apparatus according to claim 10, wherein the sensing time information is added to the sensor data.

18. The first information processing apparatus according to claim 10, wherein
the sensor includes an image sensor, and
the control signal includes a vertical synchronizing signal.

19. An information processing method, comprising:
by a first information processing apparatus:
calculating a sensing time of sensor data output from a sensor, based on sensing time information output from a second information processing apparatus including a control circuit that outputs a control signal for controlling a sensing timing of the sensor and a counter that updates a counter value in a specific cycle, wherein
the sensing time information includes a first counter value, a second counter value, and a GNSS (Global Navigation Satellite System) time in a GNSS,
the first counter value is obtained when the control signal is output, and
the second counter value is obtained when a pulse signal synchronous with the GNSS time is output from a GNSS receiver.

20. A non-transitory computer-readable medium having stored thereon, computer-executable instructions which, when executed by a computer of a first information processing apparatus, cause the computer to execute operations, the operations comprising:
calculating a sensing time of sensor data output from a sensor, based on sensing time information output from a second information processing apparatus including a control circuit that outputs a control signal for controlling a sensing timing of the sensor and a counter that updates a counter value in a specific cycle, wherein
the sensing time information includes a first counter value, a second counter value, and a GNSS (Global Navigation Satellite System) time in a GNSS,
the first counter value is obtained when the control signal is output, and
the second counter value is obtained when a pulse signal synchronous with the GNSS time is output from a GNSS receiver.

* * * * *